UNITED STATES PATENT OFFICE.

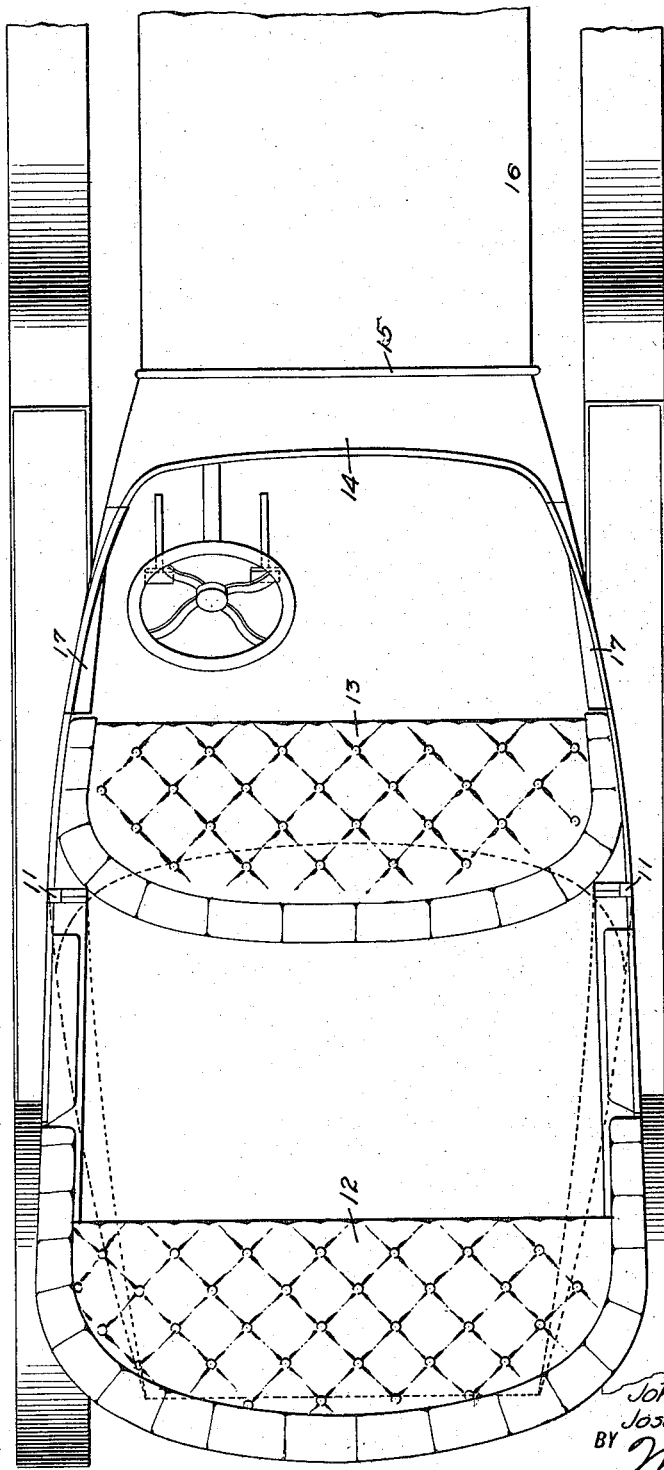

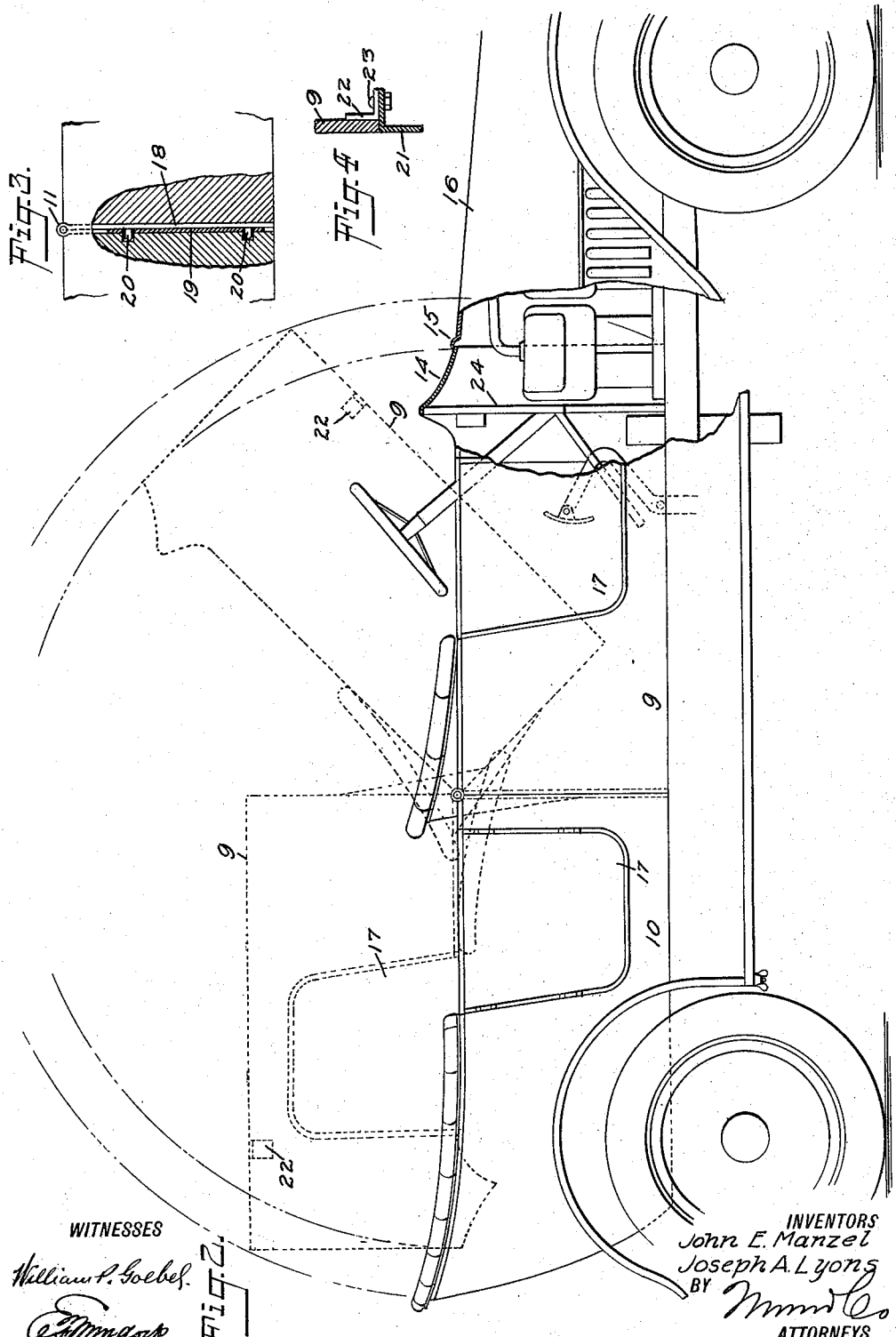

JOHN E. MANZEL AND JOSEPH A. LYONS, OF MIDDLETOWN, NEW YORK.

AUTOMOBILE-BODY.

1,155,941.  Specification of Letters Patent.  Patented Oct. 5, 1915.

Application filed March 31, 1915. Serial No. 18,285.

*To all whom it may concern:*

Be it known that we, JOHN E. MANZEL and JOSEPH A. LYONS, both citizens of the United States, and residents of Middletown, in the county of Orange and State of New York, have invented a new and Improved Automobile-Body, of which the following is a full, clear, and exact description.

Among the principal objects which the present invention has in view are: To provide for exposing the operating mechanism of an automobile, which is usually covered by the body thereof; to provide means for condensing the storage space for automobile bodies; and to provide a body for automobiles so arranged that the forward and rearward half sections may be lifted and folded each upon the other.

*Drawings.*—Figure 1 is a top plan view of an automobile body constructed and arranged in accordance with the present invention, the mud-guards and running boards of a conventional automobile being shown in connection therewith. Fig. 2 is a side elevation of the same, showing by dotted lines therein a partially raised position and a rearwardly folded position of the forward section of the body; Fig. 3 is a detail view showing the construction of the hinge straps employed for connecting the body sections; Fig. 4 is a vertical section of a fragment of the automobile body and side bar of the chassis, showing the method of uniting the same in service.

*Description.*—As seen in the drawings, an automobile body when constructed in accordance with the present invention, has a forward body section 9 and a rear body section 10. The two sections are pivotally connected by hinges 11. The rear section 10 may have a seat 12 of any conventional shape, or, where the design of the car demands, the rear section may be arranged to form what is known as a "fish-tail."

The forward body section carries a seat 13 and a cowl-dash 14. The forward edge of the dash 14 is arranged to normally rest inside of a finishing bead 15, with which the hood 16 is usually provided. From this it will be understood that in the usual operation of the hood 16, the forward body section does not interfere, and further, that when it is desired to swing backward said forward body section the hood 16 is first wholly or partially lifted. As shown in the drawings, both sections may be provided with doors 17 of conventional design and character.

The hinges 11 are provided with elongated hinge straps 18 and 19, the former of which is furnished with two or more registering pins 20, to receive which the strap 19 has corresponding perforations or holes. The pins 20 thus provided and the sockets furnished therefor preserve the alinement of the juxtaposed sections of the car body when both are lowered to active or service position.

It will be understood that when the body sections are both in service position, with the pins 20 engaging the perforations provided therefor, said body sections are structurally united to the chassis of the automobile and to the side bars 21 thereof. To this end the sections 9 and 10 are each provided with an angle bracket 22, as best shown in Fig. 4 of the drawings. Bolts 23 are used to unite said body sections and the vehicle chassis.

*Operation.*—With a body constructed and arranged as described, the operation is as follows:—If it is desired to raise the forward section 9 to obtain freedom of access to the mechanism below said section, the hood 16 is first lifted to remove the bead 15 from the cowl-dash 14. The bolts 23 being removed, the forward end of the section 9 is lifted, said section swinging on the hinges 11, upward until inverted and deposited on top of the section 10, as shown by the dotted lines in Fig. 2 of the drawings. It will be observed that the floor of the automobile and the standing dash 24 are uninterrupted by the operation just described. The tiller post and operating foot levers are not disturbed by lifting of the section 9, and are usually subsequently removed from the side bars of the chassis to expose the mechanism thereunder.

It will be understood that a similar operation is performed when it becomes desirable to gain access to the mechanism of the automobile, which is situated below the body section, the operation then being performed by lifting said body section 10 to swing on the hinges 11 forward over the section 9, where it rests in an inverted position while the needed attention is given to the mechanism or running gear of the automobile located below the normal position of said section 10.

It is equally obvious that when storing the automobile or transshipping the same, to gain space or to more conveniently dispose of the body and chassis, the body may be totally removed from said chassis, it being preferred to first fold the section 9 backward upon the section 10. If desirable, the two sections thus arranged may be covered with a dust-cloth or other suitable cover.

Claims:

1. An automobile body comprising a plurality of body sections pivotally connected at the upper edges thereof, said sections being adapted for being optionally folded, either one upon the other.

2. An automobile body comprising a plurality of body sections pivotally connected at the upper edges thereof, said sections being adapted for being optionally folded, either one upon the other; and a plurality of connecting hinges, said hinges embodying straps, one having registering pins and the other corresponding sockets for said pins.

3. An automobile body comprising a plurality of body sections pivotally connected at the upper edges thereof, said sections being adapted for being optionally folded, either one upon the other; a plurality of connecting hinges, said hinges embodying straps, one having registering pins and the other corresponding sockets for said pins; and an automobile engine hood for resting upon the front edge of the foremost of said body sections.

In testimony whereof we have signed our names to this specification in the presence of two subscribing witnesses.

JOHN E. MANZEL.
JOSEPH A. LYONS.

Witnesses:
ALLEN W. CORWIN,
CHARLES C. REDFIELD.

Copies of this patent may be obtained for five cents each, by addressing the "Commissioner of Patents, Washington, D. C."